(12) United States Patent
Seitel et al.

(10) Patent No.: US 10,017,329 B2
(45) Date of Patent: Jul. 10, 2018

(54) UNJAMMING SYSTEM FOR PRODUCT FEEDERS

(71) Applicant: Norwalt Design, Inc., Randolph, NJ (US)

(72) Inventors: Norbert Seitel, Gillette, NJ (US); Michael Seitel, Randolph, NJ (US)

(73) Assignee: Norwalt Design, Inc., Randolph, NJ (US)

( * ) Notice: Subject to any disclaimer, the term of this patent is extended or adjusted under 35 U.S.C. 154(b) by 0 days.

(21) Appl. No.: 15/364,731

(22) Filed: Nov. 30, 2016

(65) Prior Publication Data

US 2017/0081130 A1 Mar. 23, 2017

Related U.S. Application Data

(62) Division of application No. 14/455,049, filed on Aug. 8, 2014, now Pat. No. 9,533,833.

(60) Provisional application No. 61/863,505, filed on Aug. 8, 2013.

(51) Int. Cl.

| | |
|---|---|
| *B65G 43/08* | (2006.01) |
| *B65G 47/14* | (2006.01) |
| *B65G 47/00* | (2006.01) |
| *B65G 47/16* | (2006.01) |
| *B65G 47/52* | (2006.01) |

(52) U.S. Cl.
CPC ......... *B65G 43/08* (2013.01); *B65G 47/1435* (2013.01); *B65G 47/1464* (2013.01); *B65G 47/525* (2013.01)

(58) Field of Classification Search
None
See application file for complete search history.

(56) References Cited

U.S. PATENT DOCUMENTS

| | | | |
|---|---|---|---|
| 2,853,176 A | 9/1958 | Kay et al. | |
| 3,101,832 A | 8/1963 | Wyle et al. | |
| 3,224,554 A | 12/1965 | Moulder et al. | |
| 3,735,859 A | 5/1973 | Miller | |
| 4,093,062 A | 6/1978 | Sjogren | |
| 4,401,203 A | 8/1983 | McDonald et al. | |
| 4,576,286 A | 3/1986 | Buckley et al. | |
| 4,938,082 A | 7/1990 | Buckley et al. | |
| 5,638,940 A * | 6/1997 | Aoyama | B23P 19/005 |
| | | | 198/493 |
| 7,007,443 B2 | 3/2006 | Liedtke et al. | |
| 8,048,318 B1 | 11/2011 | Mogan | |
| 8,522,956 B2 * | 9/2013 | Tanner | B29C 49/4205 |
| | | | 198/395 |
| 8,701,865 B2 * | 4/2014 | Forni | B65G 11/203 |
| | | | 198/384 |

* cited by examiner

*Primary Examiner* — Kavel Singh
(74) *Attorney, Agent, or Firm* — Hoffman & Baron, LLP

(57) ABSTRACT

An unjamming system is used in connection with mass-produced parts fed through a process by a rotating bowl feeder. The bowl feeder has a bowl with an axis of rotation and an outer wall. The parts are disposed against the outer wall by centrifugal force. The unjamming system includes a jamming region adjacent the bowl, wherein unjamming is carried out. A sensor adjacent the jamming region detects a jam. A pneumatic cylinder actuator and an air blow jet adjacent the jamming region removes the parts from the jam. The parts are returned to the bowl by the air blow jet.

21 Claims, 17 Drawing Sheets

UNJAMMING SYSTEM FOR PRODUCT FEEDERS

CROSS-REFERENCE TO RELATED APPLICATIONS

This application is a divisional of U.S. application Ser. No. 14/455,049, filed Aug. 8, 2014, which claims priority to U.S. Provisional Patent Application No. 61/863,505, filed on Aug. 8, 2013, the contents of all of which are is incorporated herein by reference in their entirety.

TECHNICAL FIELD

The presently disclosed technologies are directed generally to a centrifugal bowl which feeds mass-produced parts into an automated assembly line, and more specifically, to an apparatus and method that removes a parts jam and restores the feeder to a functional state.

BACKGROUND

In the manufacture and assembly of mass-produced products, for example deodorant canisters made up of several different type parts, each part type is fed in quantity from a part source into a parts feeder. Examples of part sources include injection molding, stamping, forging, casting, or any mass-production process. The parts are conveyed to a collection area and fed onto a track in a spaced apart sequence, and in a predetermined position, i.e., all parts upright and facing the same direction in preparation for automated assembly. Any means of parts feeding can be employed, for example, a rotating bowl feeder; a rotary vibrating feeder; a linear vibrating feeder; a belt feeder; or the like.

The parts sometimes enter the track inverted or sideways, causing a jam-up of multiple parts. In this event, the process must be temporarily halted, the jammed parts removed and re-introduced to the bowl feeder, and the process resumed. Heretofore, these steps were carried out manually, requiring an operator keeping constant vigil.

Accordingly, it would be desirable to provide an apparatus capable of sensing a jam, stopping the process, removing the jam, and restarting the process, all carried out automatically, thereby avoiding the problems associated with the prior art.

SUMMARY

In one aspect, an unjamming system is used in connection with mass-produced parts fed through a process path in a process direction. The parts are fed by a parts feeder. The unjamming system comprises a jamming region wherein unjamming is carried out. A sensor is provided adjacent the process path for detecting a part error. The sensor is adapted for generating a sensor signal. Removing means, adjacent the jamming region, is responsive to the sensor signal. The removing means is for removing the parts from the jamming region. Returning means returns the parts to the parts feeder. The returning means moves the parts in a direction opposite to the process direction.

In a second aspect, an unjamming system is for use in connection with mass-produced parts fed through a process path in a process direction. The parts are fed by a parts feeder. The unjamming system comprises a jamming region wherein unjamming is carried out. A sensor is provided adjacent the process path for detecting a part error. The sensor is adapted for generating a sensor signal. First and second opposed elongated guide bars are spaced apart a predetermined distance. The guide bars are adapted for receiving and conveying the parts between the guide bars. The process path extends between the guide bars.

The first guide bar has an opening therethrough adjacent the jamming region. A guide bar segment is disposed in the first guide bar opening. The guide bar segment is adapted for conveying the parts in concert with the first guide bar. The guide bar segment is adapted for movement transversely away from the process path in response to the sensor signal. This increases the distance between the guide bar segment and the second guide bar. Thus, clearance is provided for eliminating the part error.

In a third aspect, a method is disclosed for unjamming a part error. The method is used in connection with mass-produced parts fed through a process path in a process direction. The parts are fed by a parts feeder. The method comprises providing a jamming region wherein unjamming is carried out. A part error is detected with a sensor adjacent the process path. A sensor signal is generated with the sensor. The parts are removed from the part error in response to the sensor signal. The parts are moved in a direction opposite to the process direction. The parts are then returned to the parts feeder.

In a fourth aspect, a method is disclosed for unjamming a part error. The method is used in connection with mass-produced parts fed through a process path in a process direction. The parts are fed by a parts feeder. The method comprises providing a jamming region wherein unjamming is carried out. A part error is detected with a sensor adjacent the process path. A sensor signal is generated with the sensor. First and second opposed elongated guide bars are spaced apart a predetermined distance. The parts are received and conveyed between the first and second guide bars. The process path extends between the guide bars.

An opening is provided through the first guide bar adjacent the jamming region. A guide bar segment is disposed in the first guide bar opening. The parts are conveyed along the guide bar segment in concert with the first guide bar. The guide bar segment moves transversely away from the process path in response to the sensor signal. This increases the distance between the guide bar segment and the second guide bar, thereby providing clearance for eliminating the part error.

These and other aspects, objectives, features, and advantages of the disclosed technologies will become apparent from the following detailed description of illustrative embodiments thereof, which is to be read in connection with the accompanying drawings.

DETAILED DESCRIPTION

Figure 1:
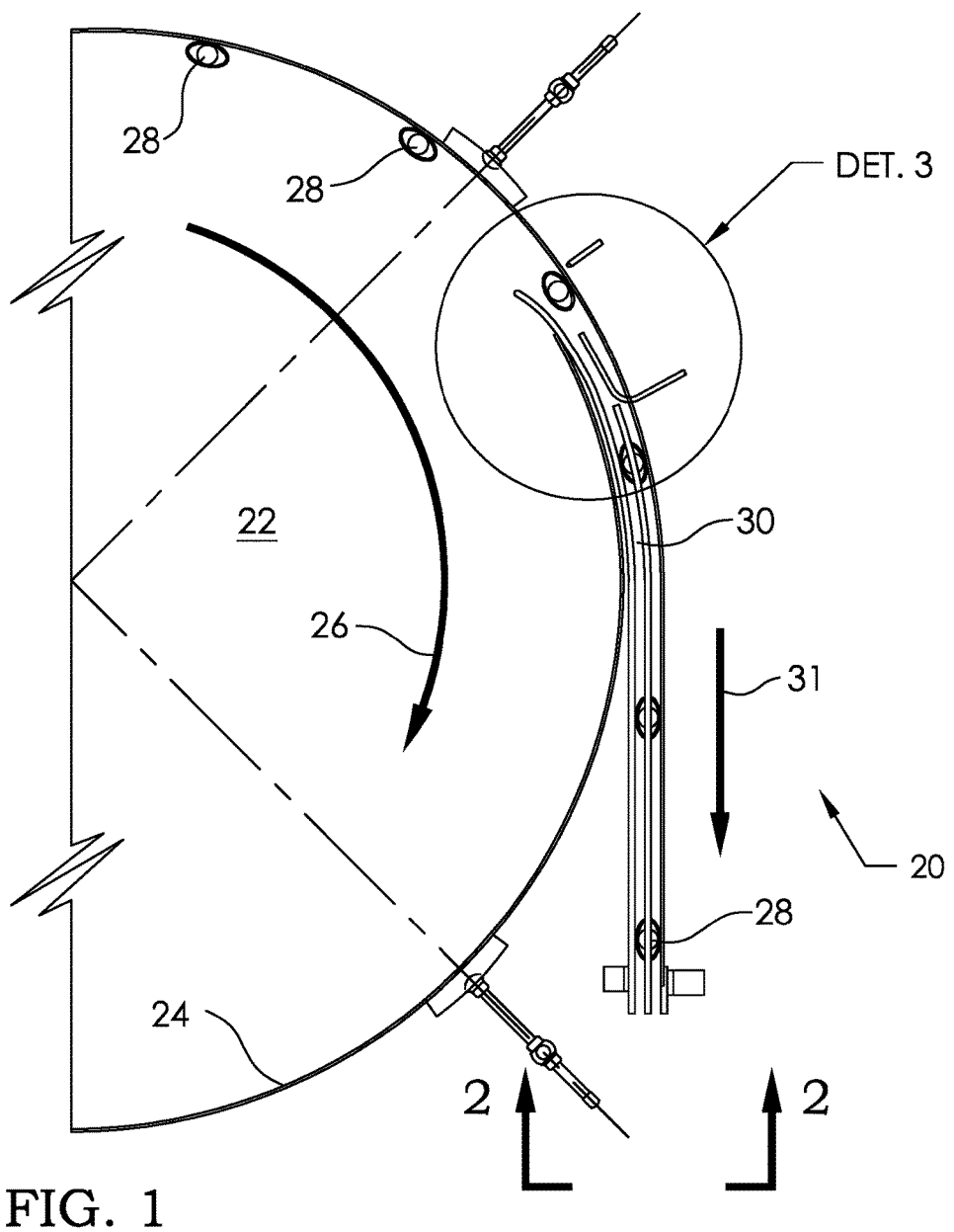
FIG. 1 is a partial, top plan view of a rotating bowl feeder utilizing an unjamming system constructed in accordance with the invention.
Figure 2:
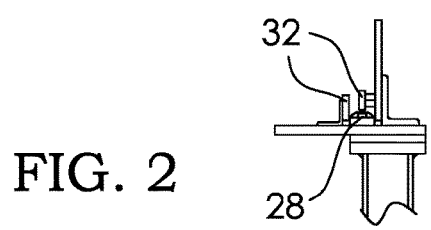
FIG. 2 is a partial, side elevational view of the rotating bowl feeder of FIG. 1, taken along lines 2-2 of FIG. 1.

Describing now in further detail these exemplary embodiments with reference to the Figures as described above, the unjamming system is typically used in a select location or locations of the process path or paths of various mass-produced product feeders. Although four exemplary rotating bowl feeder embodiments are illustrated herein, it is to be understood that the unjamming system disclosed is applicable with any process feeder within the spirit and scope of the claims. The product feeder can be rotary or linear; centrifugal or vibrating; track-fed; roller-fed; or belt-fed.

The product parts can be any mass-produced parts from any manufacturing process well known to those with ordinary skill in the art. Such processes comprise a "part source" and include, but are not limited to: injection molding; blow molding; die casting; sand casting; stamping; extruding; machining; or 3D printing. It should be noted that the drawings herein are not to scale.

As used herein, the term "process" refers to a procedure of moving, transporting and/or handling a product part. The part moves along a "process path" between assembly machines. The "process direction" is a directed flow path the product part moves in during the process. The process direction can be straight or arcuate. The direction "opposite to the process direction" means approximately 180° in reverse. It does not mean transverse at any angle. The "process rotary direction" is the direction in which a rotary feeder turns, either clockwise or counterclockwise, viewed from above, during normal operation.

As used herein, the term "process position" means the part is upright and facing in the correct position for further processing and assembly downstream. The term "skewed position" means the part is upside-down, or sideways, or angled, or jammed, or in any position not suitable for further processing downstream. Such a skewed position of one or more parts comprises a part error. A plurality of parts piled up one atop another in a chaotic fashion is also a part error. A malformed part is sometimes introduced into the process. Such a part can, for example, have "flashing" or excess material around the mold parting line. Another example is a "short shot," wherein an insufficient volume of plastic resin was injected into the mold, and the part shows a missing portion. Such a malformed part also comprises a part error. The unjamming system disclosed herein will detect and remove any kind of part error and restore the normal process.

As used herein, the term "track" refers to any apparatus capable of conveying or moving or transferring parts along the process. This includes a track, a belt conveyor, a tube having a stream of air, or a pick and place robotic arm. The track includes one or more rails, or guide bars which convey the parts along the process path. It is to be understood that all conveying apparatus configurations described herein can be utilized for all embodiments of the unjamming system, within the spirit and scope of the claims.

FIGS. 1-3C depict a parts feeder, in this example a production rotating bowl feeder having an unjamming system 20. Parts are fed from a part source (not shown) into the bowl 22 which has an outer wall 24. The bowl 22 rotates on an axis of rotation in the direction of arrow 26 during normal operation. The parts 28 are thrown by centrifugal force outward to the perimeter of the bowl 22 and against the outer wall 24. The parts 28 then circulate with the bowl in the direction of arrow 26.

Figure 3A:
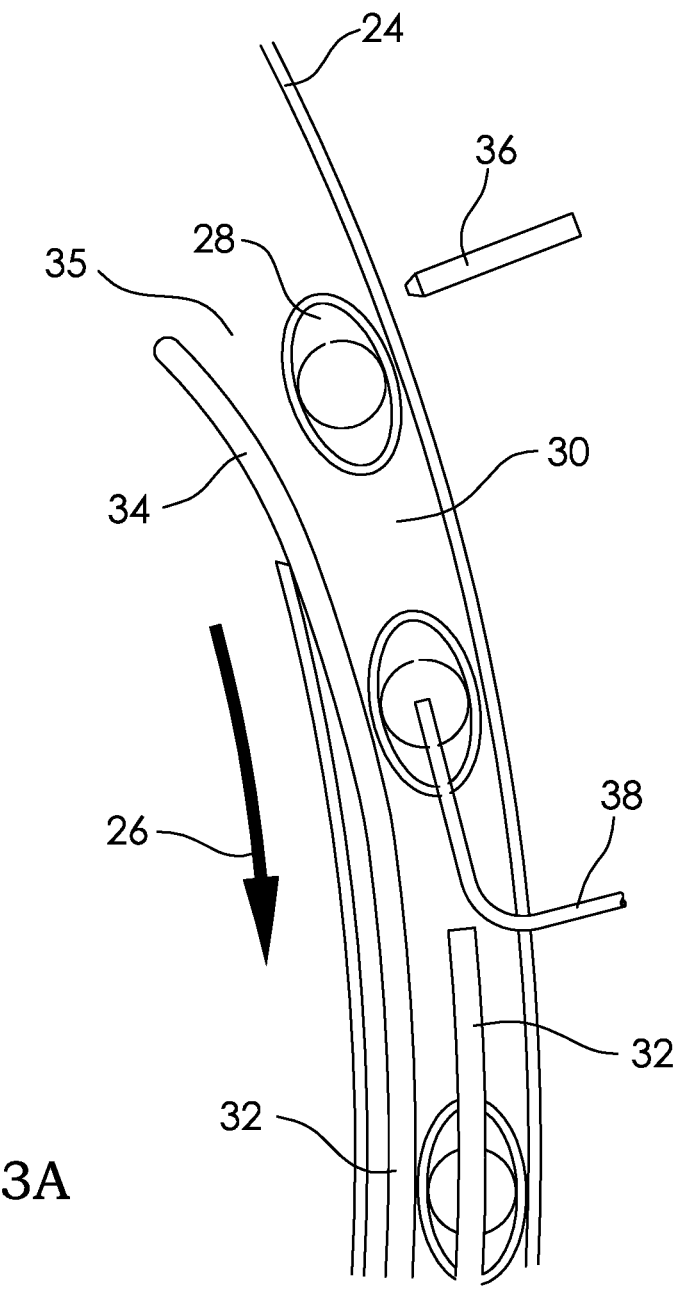
FIG. 3A is an enlarged detail view of the unjamming system of FIG. 1, taken at Detail 3 of FIG. 1, and showing the feeder in normal operation.
Figure 3B:
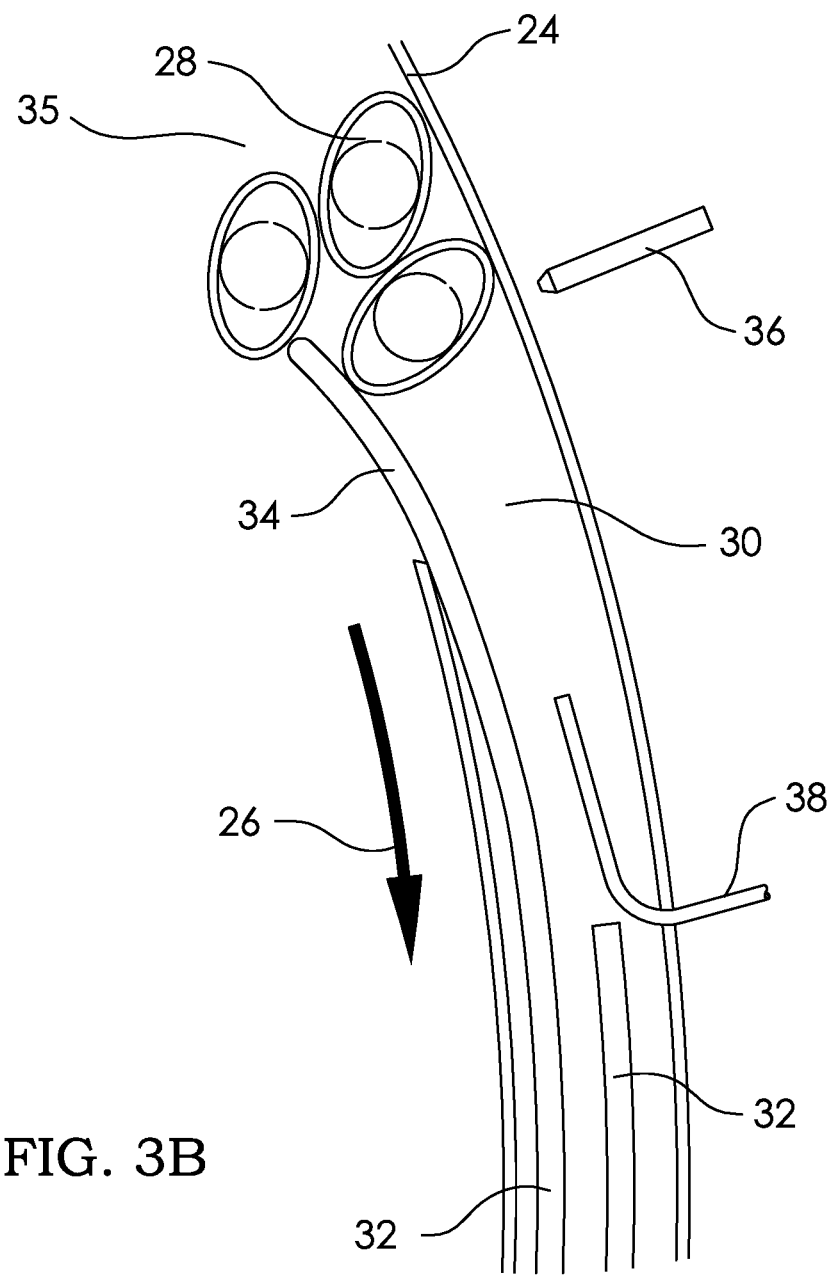
FIG. 3B is an enlarged detail view of the unjamming system of FIG. 1, taken at Detail 3 of FIG. 1, and showing the feeder during a jam.
Figure 3C:
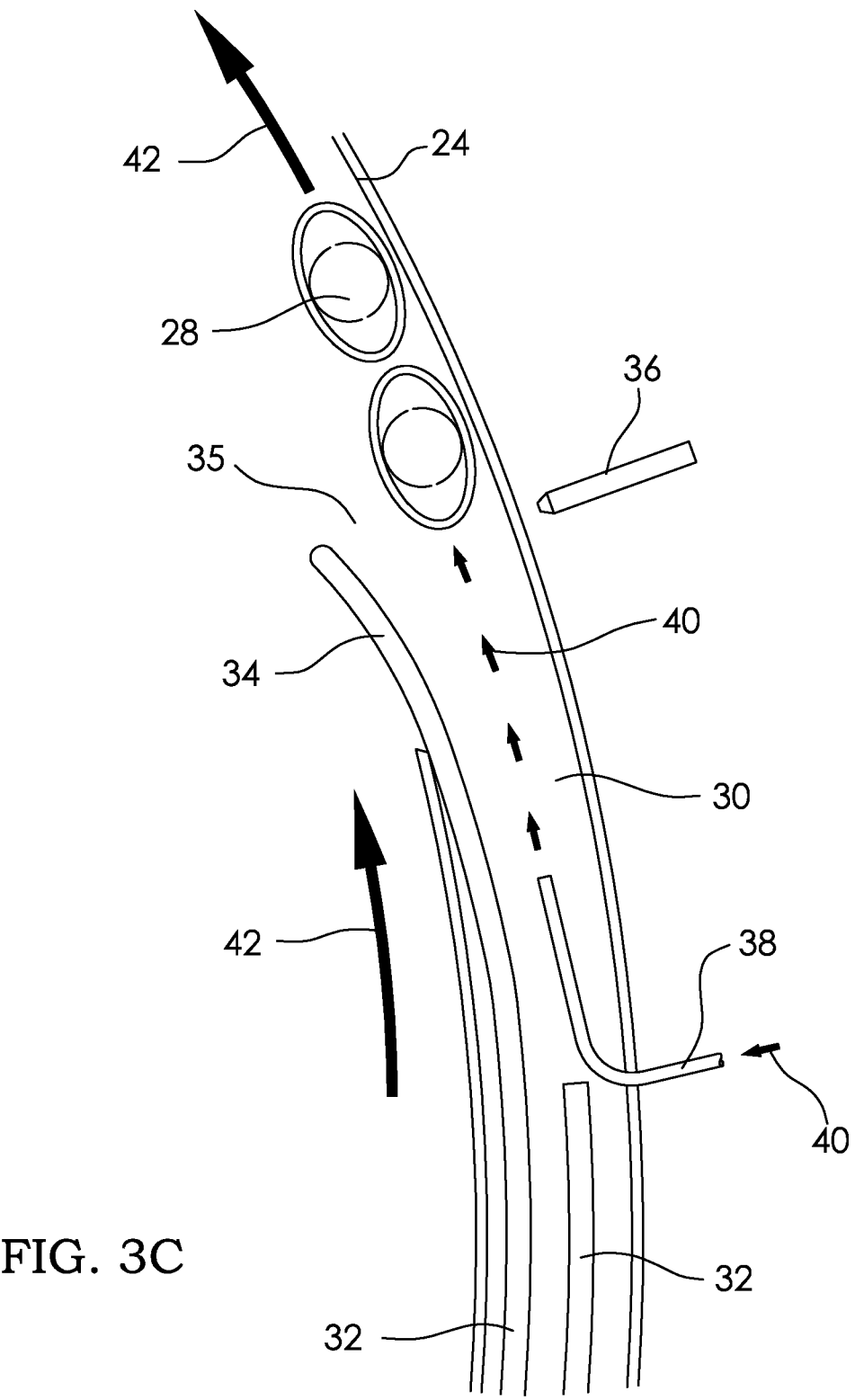
FIG. 3C is an enlarged detail view of the unjamming system of FIG. 1, taken at Detail 3 of FIG. 1, and showing the feeder during unjamming.
Figure 5:
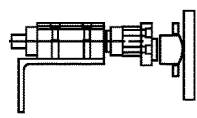
FIG. 5 is a partial, side elevational view of the unjamming system of FIG. 4.
Figure 4:
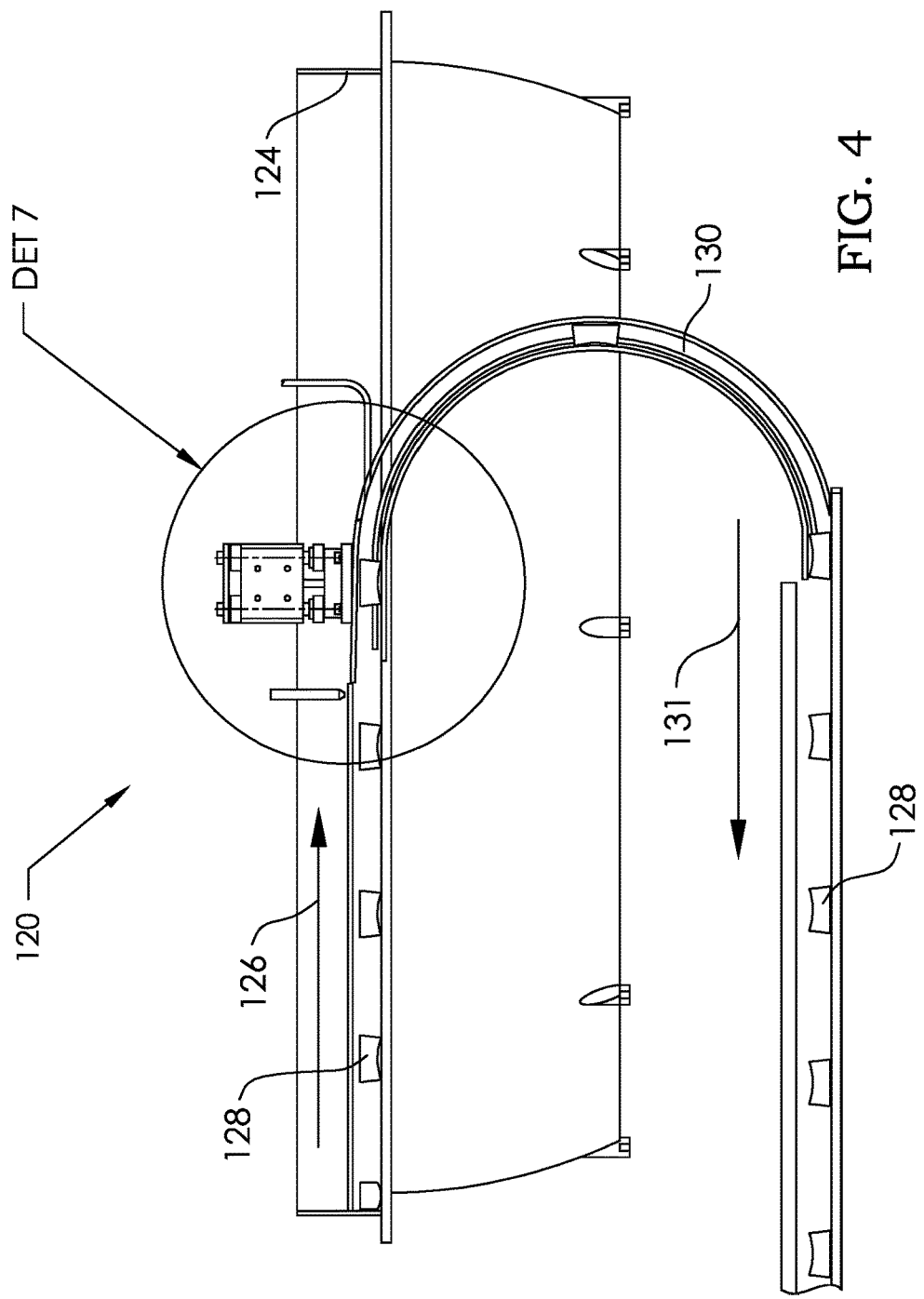
FIG. 4 is a side elevational view of another rotating bowl feeder utilizing another unjamming system constructed in accordance with the invention.
Figure 6:
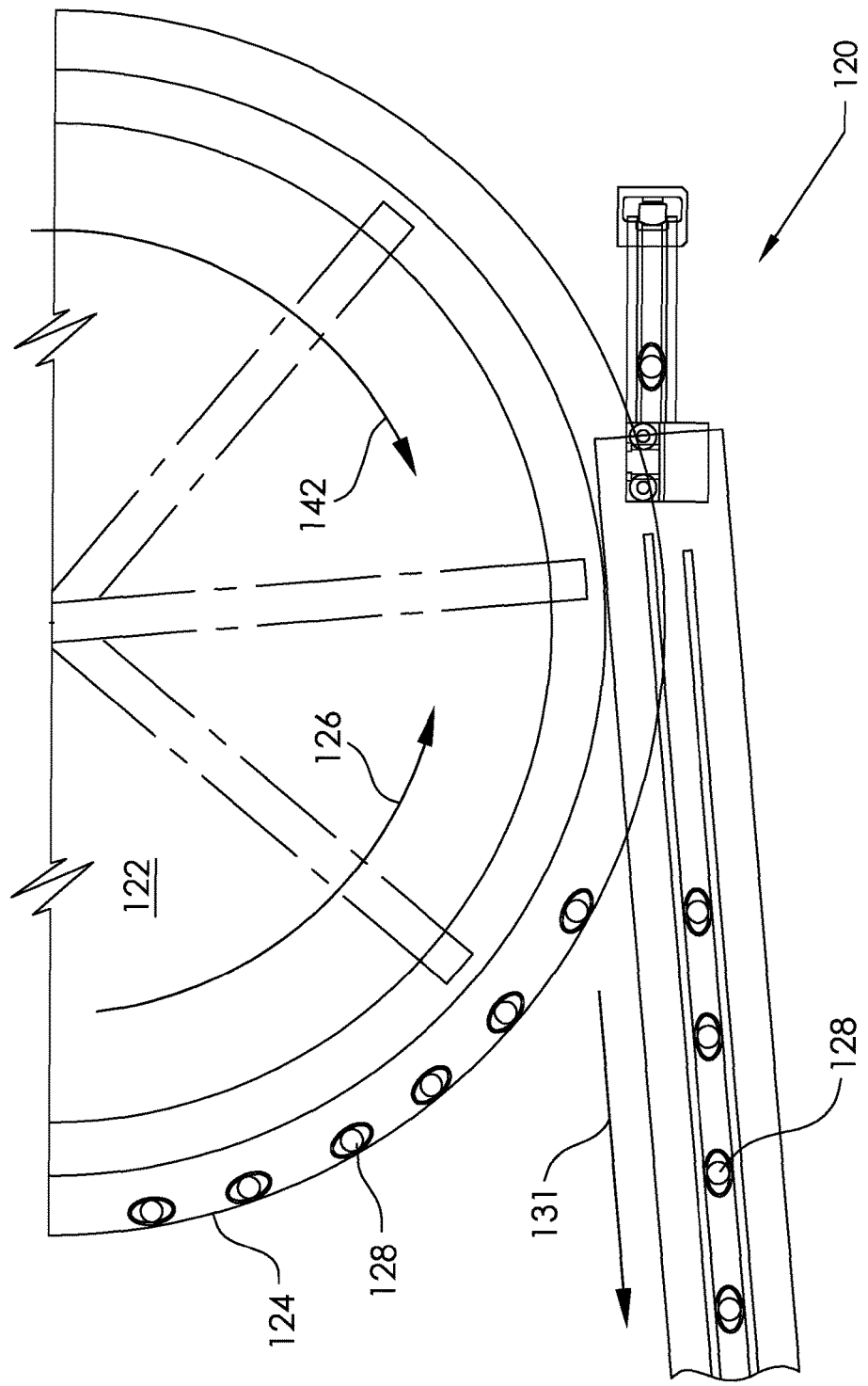
FIG. 6 is a top plan view of the rotating bowl feeder of FIG. 4.

The parts 28 enter a track 30 which is disposed generally tangential to the bowl perimeter. The parts 28 move in a process direction shown by arrow 31. The track 30 has four guide rails 32, one above the part, one below the part, and one on either side of the part 28. At least one of the guide rails 32 tapers away from the others to form a funnel-shaped portion, or track entry 34. The track entry 34 serves to guide the parts 28 onto the track 30, as shown in FIG. 3A in normal operation. The track entry 34 also serves to ensure that if a part error is to occur, it will happen at this jamming region, where it is detected and unjammed. A part 28 entering the track 30 turned sideways or upside-down will wedge as the guide rails 32 taper inward, causing a jam and part error, as shown in FIG. 3B.

The system is equipped with a sensor 36 to detect a part error. Sensor 36 is typically a laser directing light into a photocell, as is well known to those of ordinary skill in the art. It is to be understood that any sensor capable of detecting a part error can be utilized within the spirit and scope of the claims. The sensor 36 generates a sensor signal upon detecting a part error.

The system is equipped with an air nozzle 38 connected to a pressurized air supply delivering a jet of air shown by arrows 40. The nozzle is directed counter to the process direction.

In the event of a part error, the sensor 36 detects the part error. The bowl 22 reverses rotation direction, as shown by arrow 42, in response to the sensor signal. The air nozzle 38 directs the jet of air 40 against the part error, blowing the jammed parts backward into the bowl 22, in response to the sensor signal. Once the part error is cleared, the air nozzle 38 ceases blowing the jet of air 40, the bowl stops and then resumes normal rotation 26, and the parts 28 once again are fed into the track 30 in normal operation.

Referring now to FIGS. 4-7D, another parts feeder, in this example a rotating bowl feeder having an unjamming system is shown at 120. Unjamming system 120 is similar to unjamming system 20 described above, in that parts are fed from a part source (not shown) into the bowl 122 which has an outer wall 124. The bowl 122 rotates on an axis of rotation in the process rotary direction of arrow 126 during normal operation. The parts 128 are thrown by centrifugal force outward to the perimeter of the bowl 122 and against the outer wall 124. The parts 128 then circulate with the bowl in the direction of arrow 126.

The parts 128 enter a track 130 which is disposed generally tangential to the bowl perimeter. The parts 128 move in a process direction shown by arrow 131. The track 130 has four guide rails 132, one above the part, one below the part, and one on either side of the part 128. The track 130 shown curves 180° and directs the parts onto a straight track. It is to be understood that the track can be any configuration extending in any direction. All track configurations can be utilized for all embodiments of the unjamming system, within the spirit and scope of the claims.

The system is equipped with a sensor 136 to detect a part error. Sensor 136 is typically a laser directing light into a photocell, as is well known to those of ordinary skill in the art. The sensor 136 generates a sensor signal upon detecting a part error. It is to be understood that any sensor capable of detecting a part error can be utilized within the spirit and scope of the claims.

The system is equipped with an air nozzle 138 connected to a pressurized air supply delivering a jet of air shown by arrows 140. The nozzle 138 is directed in a direction opposite to the process direction 131.

Unjamming system 120 differs from unjamming system 20 described above, in that system 120 has first 133 and second 137 opposed elongated guide bars spaced apart a predetermined distance. The first 133 and second 137 guide bars receive and convey the parts 128 between the guide bars. The process path extends between the guide bars 133, 137. The first guide bar 133 has an opening 139 therethrough adjacent the jamming region 135. A guide bar segment 134 is disposed in the first guide bar opening 139. The guide bar segment 134 conveys the parts in concert with the first guide bar 133. The guide bar segment 134 is able to move transversely away from the process path in response to the sensor signal. This increases the distance between the guide bar segment 134 and the second guide bar 137. The result is to provide clearance for eliminating the part error. The guide bar segment 134 is adapted for movement between a first position inboard of the first guide bar 133 and a second position outboard of the first position. In the first position the distance between the guide bar segment 134 and the second guide bar 137 is less than the predetermined distance between the first 133 and second 137 guide bars. The parts 128 follow the process path allowing passage therethrough of parts in a process position, and denying passage therethrough of parts in a skewed position. The skewed parts will stop moving through the process path and will come to rest captured against the guide bar segment 134. This results in a parts error, which the sensor 136 will detect. The sensor 136 will then generate a signal which will cause the guide bar segment 134 to move away from the process path. In the second position the distance between the guide bar segment 134 and the second guide bar 137 is sufficient to release the skewed part, thereby providing clearance for eliminating the part error.

Figure 7A:
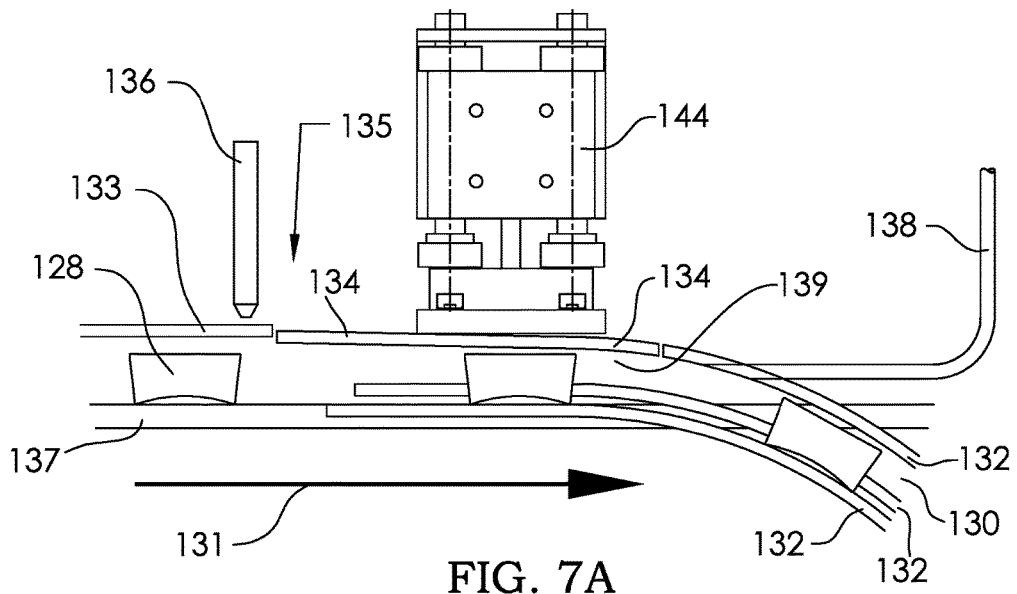
FIG. 7A is an enlarged, detail view of the unjamming system of FIG. 4, taken at Detail 7 of FIG. 4, and showing the feeder in normal operation.
Figure 7B:
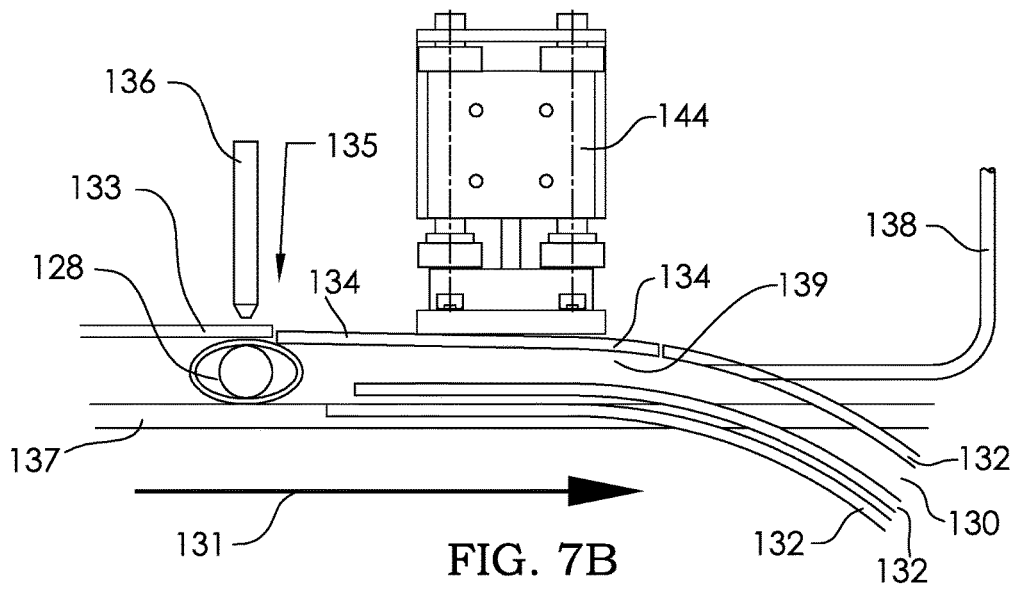
FIG. 7B is an enlarged, detail view of the unjamming system of FIG. 4, taken at Detail 7 of FIG. 4, and showing the feeder during a jam.
Figure 7C:
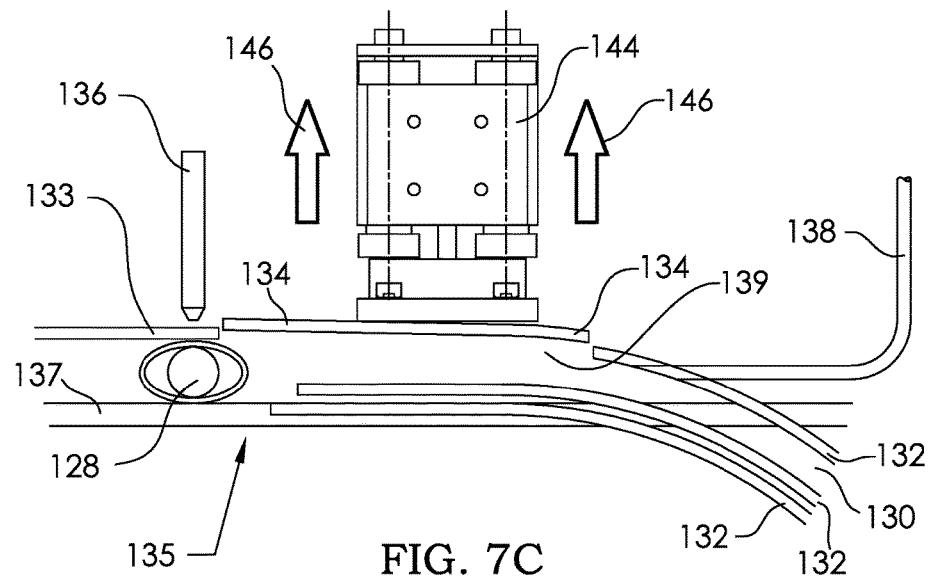
FIG. 7C is an enlarged, detail view of the unjamming system of FIG. 4, taken at Detail 7 of FIG. 4, and showing the feeder during unjamming.
Figure 7D:
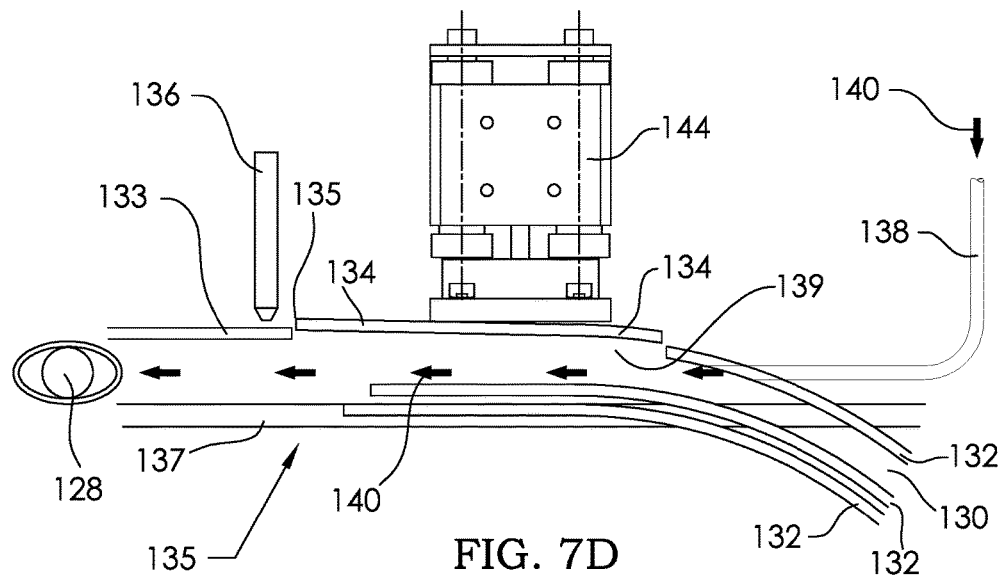
FIG. 7D is an enlarged, detail view of the unjamming system of FIG. 4, taken at Detail 7 of FIG. 4, and showing the feeder during unjamming.

In the embodiment shown, the first guide bar 133 is disposed above the second guide bar 137. The movable guide bar segment 134 is adapted to be raised upward away from the first guide bar 133. The guide bar segment 134 is disposed slightly lower than the first guide bar 133 by a predetermined offset to form a jamming region 135. The parts 128, when properly positioned upright and facing the process direction, will pass under guide bar segment 134, as shown in FIG. 7A. In the event of a part turning sideways, or skewed in some manner, the part 128 will jam underneath the guide bar segment 134, as shown in FIG. 7B. The predetermined offset is designed to ensure that if a jam or part error occurs, it happens at the guide bar segment 134, where it is detected and unjammed. An actuator 144 is adapted to raise the guide bar segment 134 until it is at or above the level of the first guide bar 133, as shown in FIG. 7C. However, the system will function if the guide bar segment 134 is raised to a trivial distance below the first guide bar 133. Arrows 146 show the raising upward of the guide bar segment 134. Actuator 144 is typically a pneumatic cylinder or double cylinder, as illustrated. It is to be understood that the actuator 144 can be a motor driven screw, a hydraulic cylinder, a solenoid, or any device capable of raising the guide bar segment 134. All actuator types can be utilized for all embodiments of the unjamming system, within the spirit and scope of the claims.

In the event of a part error, the sensor 136 detects the part error. The bowl 122 reverses for rotation in a direction opposite to the process rotary direction, as shown by arrow 142, in response to the sensor signal. At about this time, the actuator 144 raises the guide bar segment 134, in response to the sensor signal.

The air nozzle 138 directs the jet of air 140 against the part error, blowing the jammed parts backward into the bowl 122. Once the part error is cleared, the air nozzle 138 ceases blowing the jet of air 140, the bowl stops and then resumes normal rotation 126, the actuator 144 lowers the guide bar segment 134 back into normal position, and the parts 128 once again are fed into the track 130, resuming normal operation.

Turning now to FIGS. 8-11B, yet another parts feeder, specifically for example, a rotating bowl feeder 222 having yet another unjamming system is shown at 220. Unjamming system 220 is similar to unjamming system 20 described above, in that parts are fed from a part source (not shown) into the bowl 222 which has an outer wall 224. The bowl 222 rotates on an axis of rotation in the process rotary direction of arrow 226 during normal operation. The parts 228 are thrown by centrifugal force outward to the perimeter of the bowl 222 and against the outer wall 224. The parts 228 then circulate with the bowl in the direction of arrow 226.

The parts 228 enter a track 230 which is disposed generally tangential to the bowl perimeter. The parts 228 move in a process direction shown by arrow 231. The track 230 has four guide rails 232, one above the part, one below the part, and one on either side of the part 228. The track 230 shown curves 180° and directs the parts onto a straight track. It is to be understood that the track can be any configuration extending in any direction. All track configurations can be utilized for all embodiments of the unjamming system, within the spirit and scope of the claims.

The system is equipped with a sensor 236 to detect a part error. Sensor 236 is typically a laser directing light into a photocell, as is well known to those of ordinary skill in the art. The sensor 236 generates a sensor signal upon detecting a part error. It is to be understood that any sensor capable of detecting a part error can be utilized within the spirit and scope of the claims.

The system is equipped with an air nozzle 238 connected to a pressurized air supply delivering a jet of air shown by arrows 240. The nozzle 238 is directed opposite to the process direction.

Unjamming system 220 differs from unjamming system 20 described above, in that system 220 has first 233 and second 237 opposed elongated guide bars spaced apart a predetermined distance. The first 233 and second 237 guide bars receive and convey the parts 228 between the guide bars. The process path extends between the guide bars 233, 237. The first guide bar 233 has an opening 239 therethrough adjacent the jamming region 235. A guide bar segment 234 is disposed in the first guide bar opening 239. The guide bar segment 234 conveys the parts in concert with the first guide bar 233. The guide bar segment 234 is able to move transversely away from the process path in response to the sensor signal. This increases the distance between the guide bar segment and the second guide bar. The result is to provide clearance for eliminating the part error.

The first 233 and second 237 guide bars are spaced apart generally horizontally. The parts 228 are supported against gravity, in this case by second guide bar 237. The guide bar segment 234 is adapted for movement between a first position generally aligned with the first guide bar 233 and a second position outboard of the first position. In the first position the distance between the guide bar segment 234 and the second guide bar 237 is generally equal to the predetermined distance between the first 233 and second 237 guide bars. The parts follow the process path allowing passage therethrough of parts in a process position. In the second position the distance between the guide bar segment 234 and the second guide bar 237 is greater than the predetermined distance between the first 233 and second 237 guide bars. This opens up a space in the event of a part error, so that the parts are no longer supported and will fall by gravity.

Figure 8:
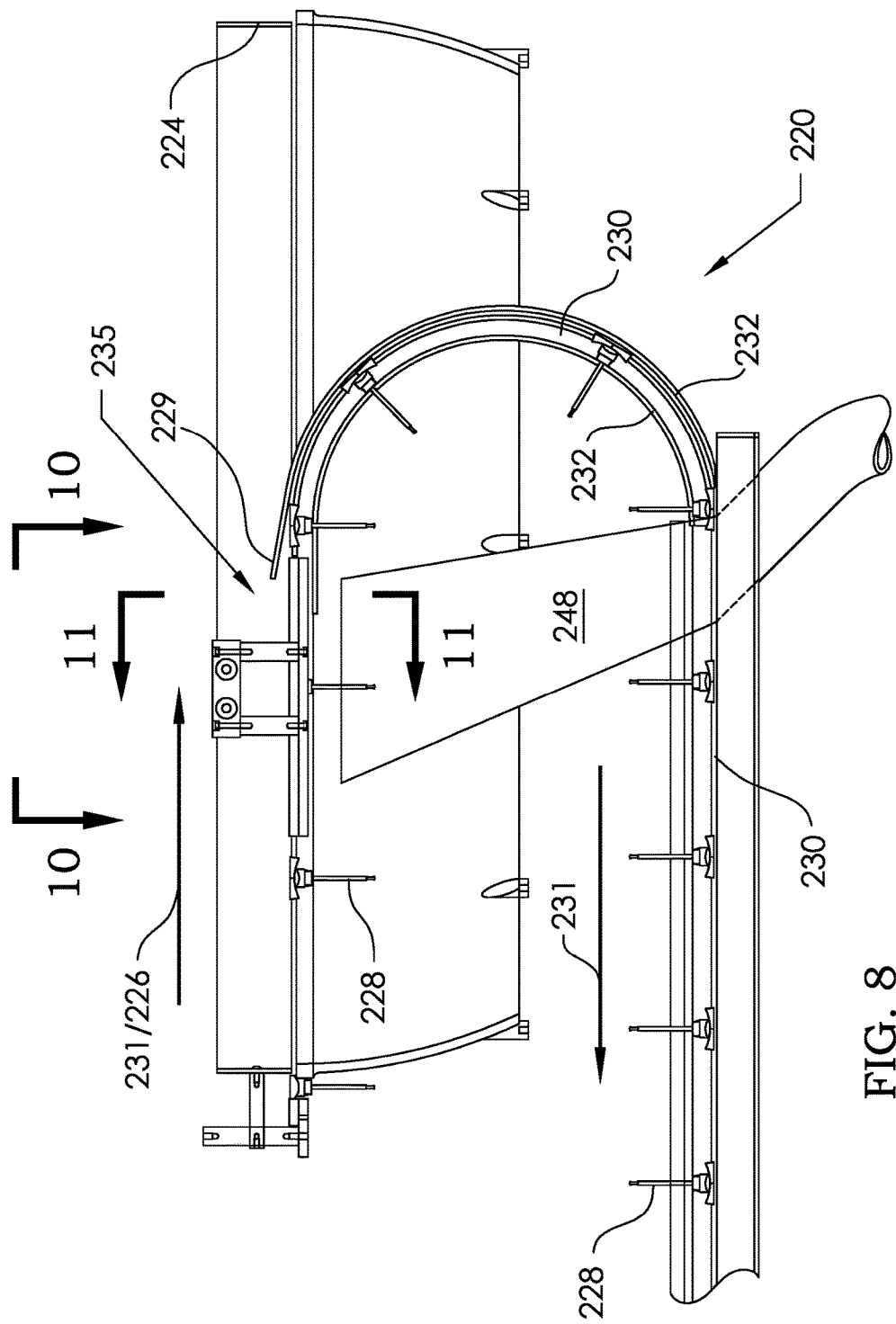
FIG. 8 is a side elevational view of yet another rotating bowl feeder utilizing yet another unjamming system constructed in accordance with the invention.
Figure 9:
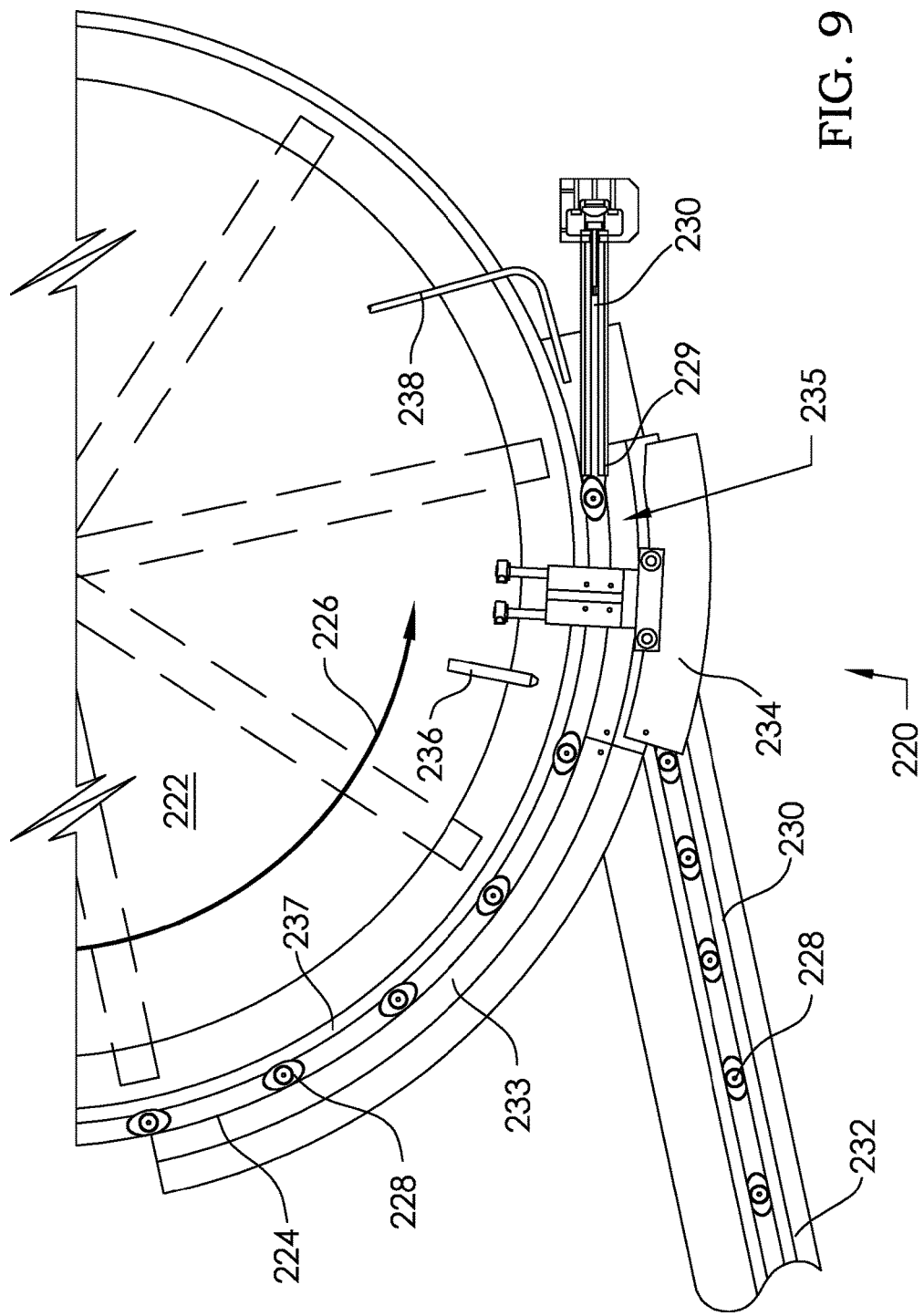
FIG. 9 is a top plan view of the rotating bowl feeder of FIG. 8.
Figure 10A:
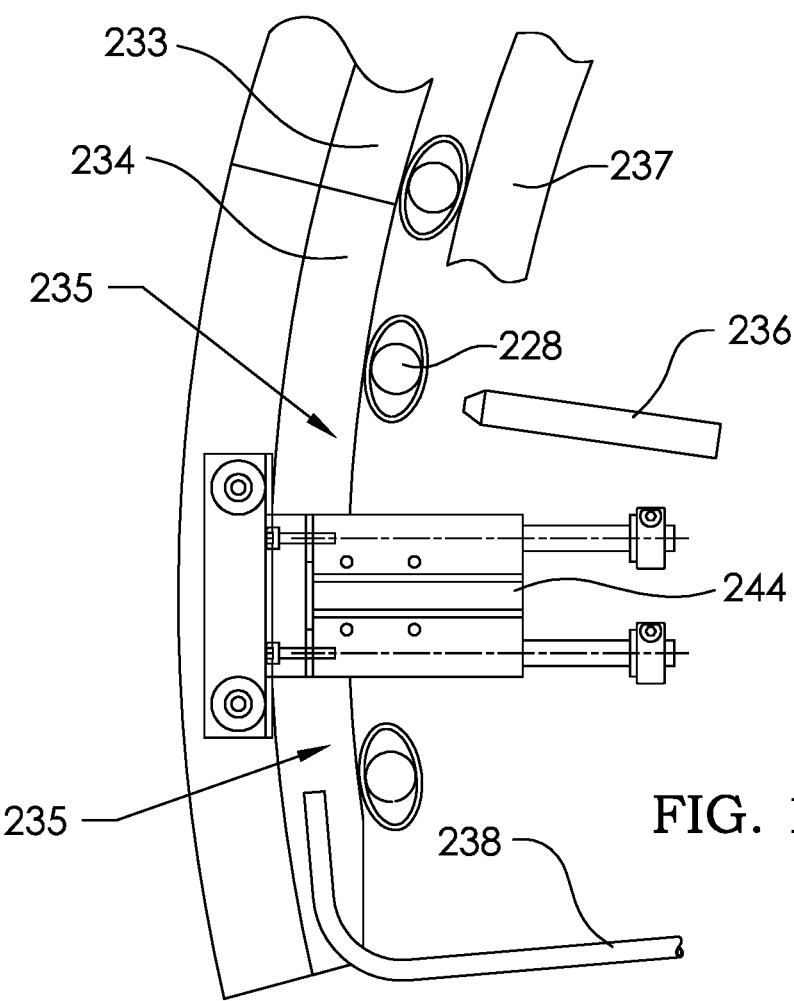
FIG. 10A is an enlarged, detail top plan view of the unjamming system of FIG. 8, taken at 10-10 of FIG. 8, and showing the feeder in normal operation. The view is rotated 90° cw.
Figure 11A:
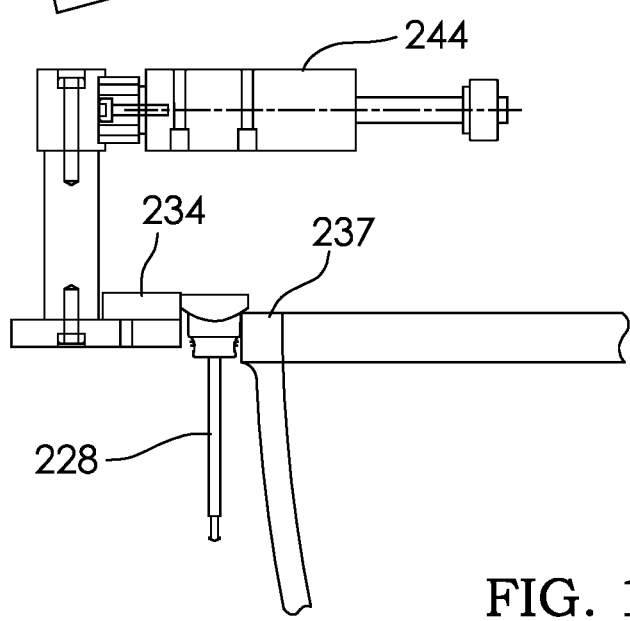
FIG. 11A is an enlarged, detail side elevational view of the unjamming system of FIG. 8, taken at 11-11 of FIG. 8, and showing the feeder in normal operation.

In the embodiment shown, the first guide bar 233 is arcuate. The movable guide bar segment 234 is also arcuate, and is able to move sideways away from the first guide bar 233 and away from the guide rails 232. Guide bar segment 234 is aligned with first guide bar 233 under normal operating conditions, as shown in FIGS. 10A and 11A. At least one of the guide rails 232, in this case the upper guide rail tapers to form a funnel-shaped portion, or track entry 229. The track entry 229 serves to guide the parts 228 onto the track 230, as shown in FIG. 8 in normal operation. The track entry 229 also serves to ensure that if a jam-up or part error is to occur, it will happen at this jamming region 235, where it is detected and unjammed. The track entry 229 can be formed by any of the guide rails 232, even those not shown tapered. Any guide rail that is tapered can be utilized as track entry 229 for all embodiments of the unjamming system, within the spirit and scope of the claims. A part 228 entering the track 230 turned sideways or upside-down will wedge as the track entry 229 tapers toward the track 230 in the process direction, causing a jam and pile-up, which is a part error, in the jamming region 235. The parts 228, when properly positioned upright and facing the process direction, will pass through guide bar segment 234 and onto the track 230. In the event of a part turning sideways, or skewed in some manner, the part 228 will jam adjacent the jamming region 235.

Figure 10B:
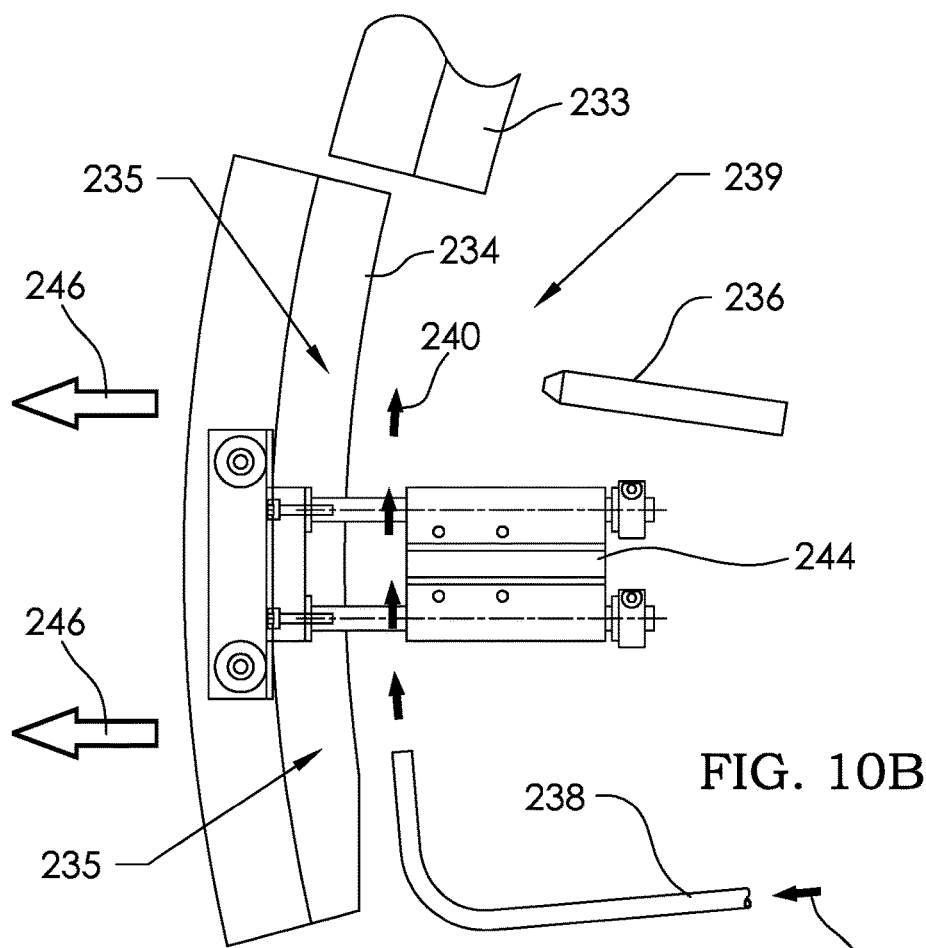
FIG. 10B is an enlarged, detail top plan view of the unjamming system of FIG. 8, taken at 10-10 of FIG. 8, and showing the feeder during unjamming. The view is rotated 90° cw.
Figure 11B:
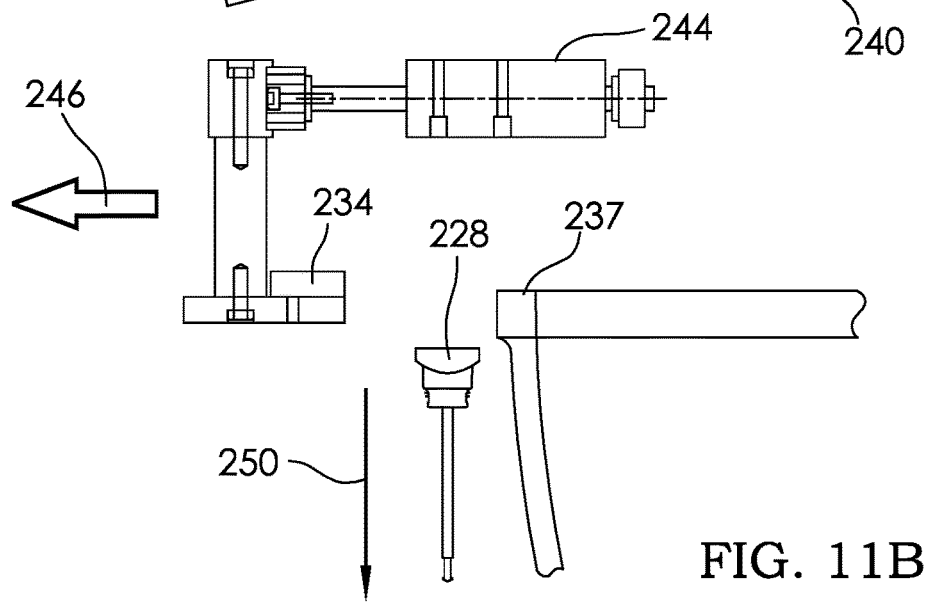
FIG. 11B is an enlarged, detail side elevational view of the unjamming system of FIG. 8, taken at 11-11 of FIG. 8, and showing the feeder during unjamming.
Figure 12:
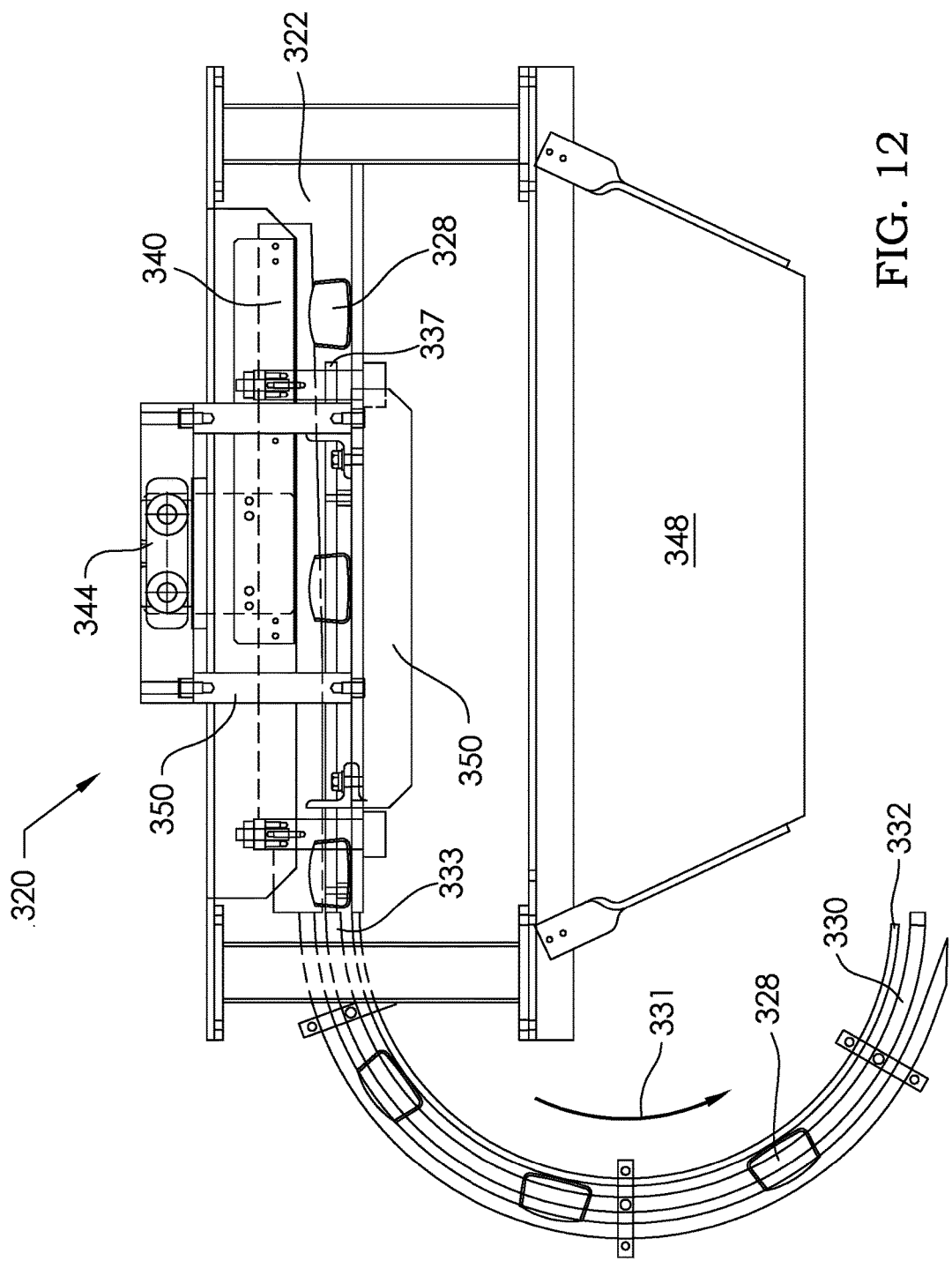
FIG. 12 is a side elevational view of still another rotating bowl feeder utilizing still another unjamming system constructed in accordance with the invention.

An actuator 244 is adapted to move the guide bar segment 234 sideways as shown in FIGS. 10B and 11B, until a gap opens between the guide bar segment 234 and the first guide bar 233 as shown in FIG. 11B. Arrows 246 show the outward movement of the guide bar segment 234. Actuator 244 is typically a pneumatic cylinder or double cylinder, as illustrated. It is to be understood that the actuator 244 can be a motor driven screw, a hydraulic cylinder, a solenoid, or any device capable of translating the guide bar segment 234. All actuator types can be utilized for all embodiments of the unjamming system, within the spirit and scope of the claims.

In the event of a part error, the sensor 236 detects the part error. At about this time, the actuator 244 translates the guide bar segment 234 outward, in response to the sensor signal. The air nozzle 238 directs the jet of air 240 against the part error, in response to the sensor signal, blowing the jammed or skewed parts off the guide bars 234, 237 as shown in FIG. 11B. The freed parts 228 fall by gravity, shown by arrow 250, down into a parts receiver (hopper) 248 from which they are discarded or conveyed back into the bowl 222 (conveyor not shown). Once the part error is cleared, the air nozzle 238 ceases blowing the jet of air 240, the actuator 244 translates the guide bar segment 234 back into normal position, and the parts 228 once again are fed into the track 230, resuming normal operation.

Referring now to FIGS. 12-16, still another parts feeder, in this example rotating bowl feeder having still another unjamming system is shown at 320. Unjamming system 320 is similar to unjamming system 20 described above, in that parts are fed from a part source (not shown) into the bowl 322 which has an outer wall 324. The bowl 322 rotates on an axis of rotation in the direction of arrow 326 during normal operation. The parts 328 are thrown by centrifugal force outward to the perimeter of the bowl 322 and against the outer wall 324.

Unjamming system 320 differs from unjamming system 20 described above, in that the parts 328 drop into pockets 327, one part per pocket 327. The pockets 327 are closed on three sides and open along the outer side 338, where the outer wall 324 retains the part 328 in the pocket 327. The parts 328 then circulate with the bowl in the direction of arrow 326. The parts 328 are pulled individually out of each pocket by a part discharger mounted on a bracket 350. The part discharger 329 has an articulated finger which is inserted into the part and pulls the part outward. The parts 328 enter a track 330 which is disposed adjacent the bowl. The parts 328 then move off in a process direction shown by arrow 331. The track 330 has four guide rails 332, one above the part, one below the part, and one on either side of the part 328. Unjamming system 320 has first 333 and second 337 opposed elongated guide bars spaced apart a predetermined distance. The first 333 and second 337 guide bars receive and convey the parts 328 between the guide bars. The process path extends between the guide bars 333, 337. The first guide bar 333 has an opening 339 therethrough adjacent the jamming region 335. A guide bar segment 334 is disposed in the first guide bar opening 339. The guide bar segment 334 conveys the parts in concert with the first guide bar 333. The guide bar segment 334 is able to move transversely away from the process path in response to the sensor signal. This increases the distance between the guide bar segment 334 and the second guide bar 337. The result is to provide clearance for eliminating the part error.

The first 333 and second 337 guide bars are spaced apart generally horizontally. The parts 328 are supported against gravity, in this case by third guide bar 342. The guide bar segment 334 is adapted for movement between a first position generally aligned with the first guide bar 333 and a second position outboard of the first position. In the first position the distance between the guide bar segment 334 and the second guide bar 337 is generally equal to the predetermined distance between the first 333 and second 337 guide bars. The parts follow the process path allowing passage therethrough of parts in a process position. In the second position the distance between the guide bar segment 334 and the second guide bar 337 is greater than the predetermined distance between the first 333 and second 337 guide bars. This opens up a space in the event of a part error, allowing the parts to be removed, as explained hereinbelow.

The system is equipped with a sensor 336 to detect a part error. Sensor 336 is typically a laser directing light into a photocell, as is well known to those of ordinary skill in the art. The sensor 336 generates a sensor signal upon detecting a part error. It is to be understood that any sensor capable of detecting a part error can be utilized within the spirit and scope of the claims.

Figure 13:
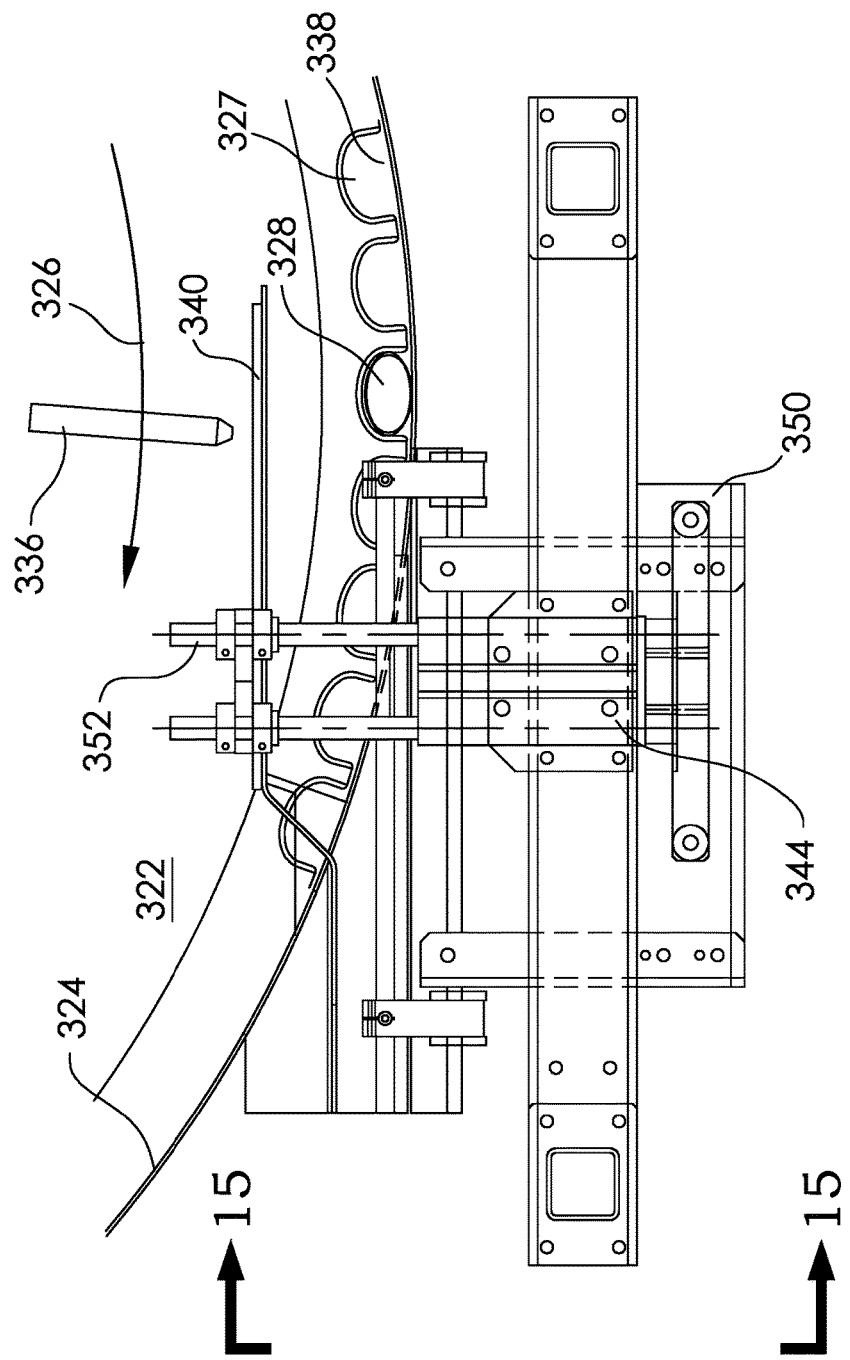
FIG. 13 is a top plan view of the rotating bowl feeder of FIG. 12, and showing the feeder in normal operation.
Figure 14:
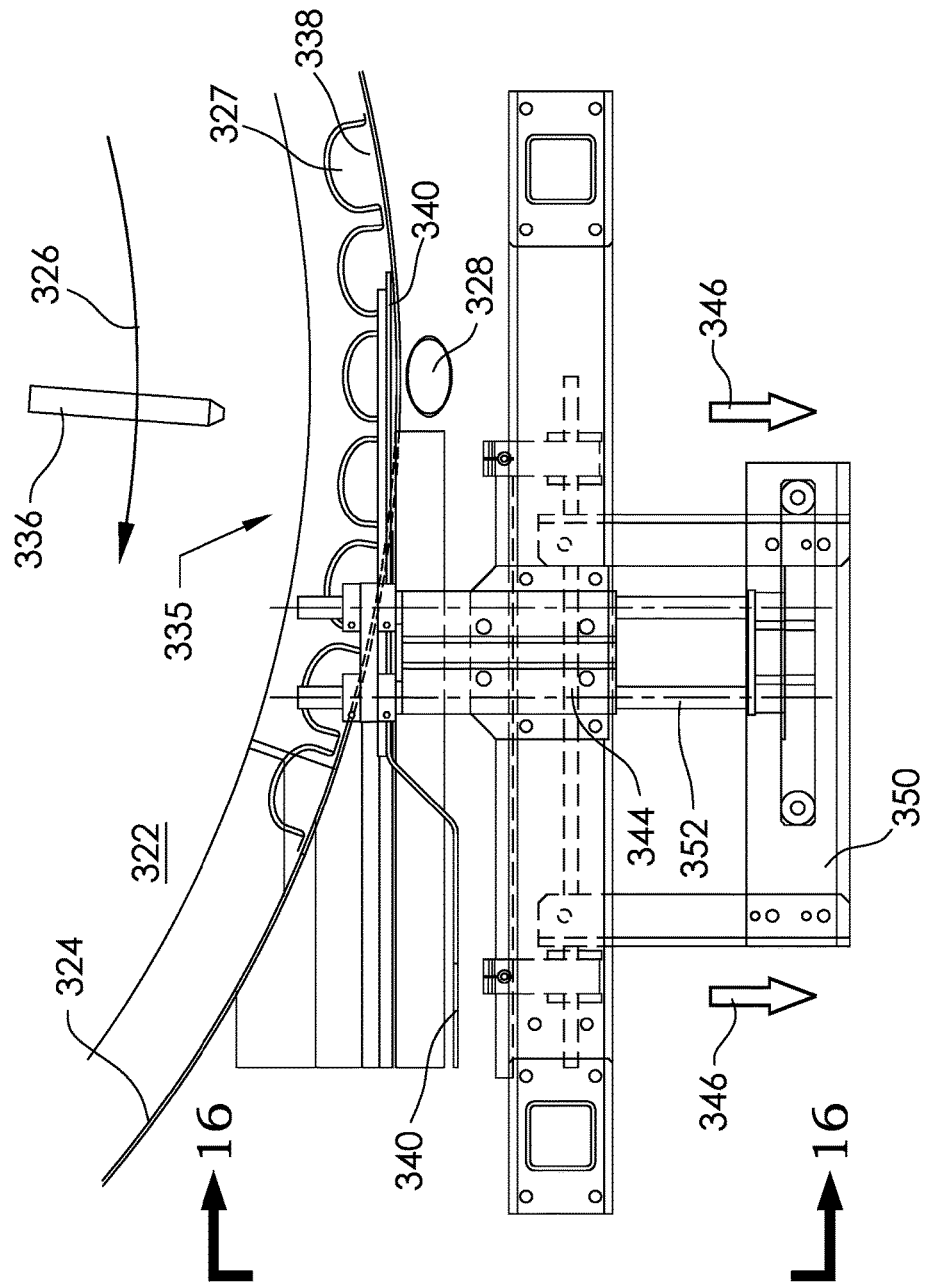
FIG. 14 is a top plan view of the rotating bowl feeder of FIG. 12, and showing the feeder during unjamming.
Figure 15:
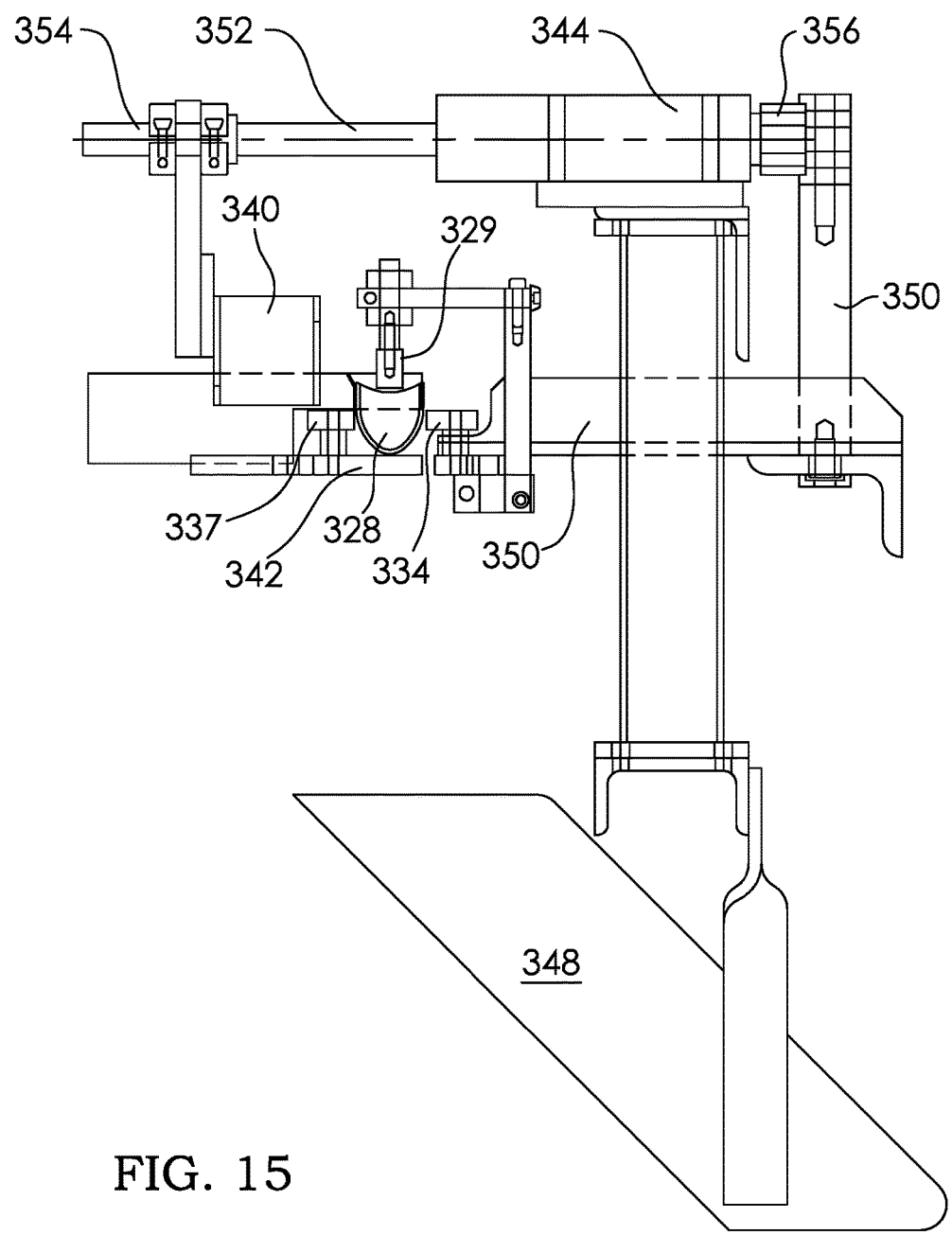
FIG. 15 is a side elevational view of the rotating bowl feeder of FIG. 12, taken at 15-15 of FIG. 13, and showing the feeder in normal operation. The view is rotated 90° ccw.
Figure 16:
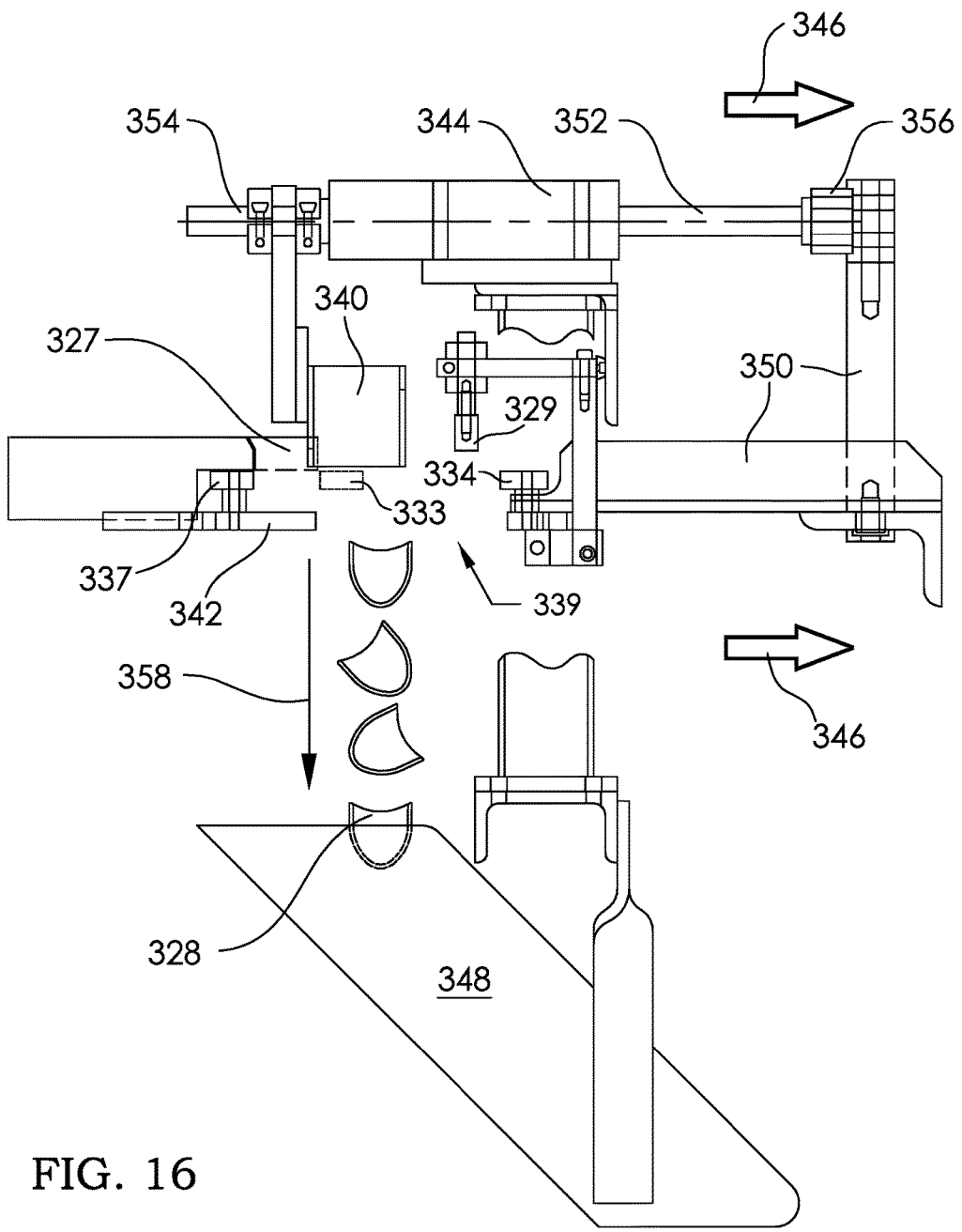
FIG. 16 is a side elevational view of the rotating bowl feeder of FIG. 12, taken at 16-16 of FIG. 14, and showing the feeder during unjamming. The view is rotated 90° ccw.

Since each pocket 327 holds only one part 328, a part error does not result in a pile-up. A part error comprises a part received in a pocket inverted or sideways or in some skewed position. The bowl 322 is rotary indexed until the pocket having the part error is angularly aligned with a jamming region 335, where the bowl rotation is stopped. The outer wall 324 is discontinuous in the jamming region 335, leaving the pocket 327 open on the outer side 338. A sweep bar 340 is disposed adjacent the jamming region 335. The sweep bar 340 is adapted to be moved transversely across the pockets 327, sweeping the parts 328 out of the pockets 327. The sweep bar 340 is parked out of the way of the pockets 327 under normal operating conditions, as shown in FIG. 13.

An actuator 344 has cylinder rods 352 adapted to translate inward and outward with respect to the bowl axis of rotation. The sweep bar 340 is attached to an inboard end 354 of the cylinder rods 352. The bracket 350 is attached to an outboard end 356 of the cylinder rods 352. The guide bar segment 334 is also attached to the cylinder rods' outboard end 356. As the cylinder rods 352 translate outward in response to the sensor signal, the bracket 350, the guide bar segment 334, and the part discharger 329 all move outward, opening a space outboard of the pockets 327. The sweep bar 340 moves outward simultaneously pushing the parts 328 out of the pockets 327. The sweep bar is adapted for movement between a first position inboard of the outer wall to a second position outboard of the outer wall. The sweep bar 340 is vertically juxtaposed with the parts 328. Upon movement from the first position to the second position the sweep bar 340 will sweep the parts out of the bowl 322, and the part discharger 329 will move outward, out of the way of the sweep bar 340, allowing the parts 328 to be swept outward. The parts 328 will then fall by gravity, as shown by arrow 358, to be discarded or collected into a hopper 348. Arrows 346 show the outward movement of the cylinder rods 352 and the bracket 350. Actuator 344 is typically a pneumatic cylinder or double cylinder, as illustrated. It is to be understood that the actuator 344 can be a motor driven screw, a hydraulic cylinder, a solenoid, or any device capable of translating the bracket 350, the guide bar segment 334, and the discharger 329, and any associated parts. All actuator types described can be utilized for all embodiments of the unjamming system, within the spirit and scope of the claims.

In the event of a part error, the sensor 336 detects the part error. The bowl 322 is rotary indexed into juxtaposition with the jamming region 335, where the bowl rotation is stopped. The actuator 344 translates the bracket 350, the guide bar segment 334, and the discharger 329 outward. The sweep bar 340 translates across the pockets 327, sweeping the parts 328 out of the pockets 327 and into the hopper 348. The freed parts 328 are either discarded or conveyed back into the bowl 322 (conveying means not shown). Once the part error is cleared, the actuator 344 translates the bracket 350, the guide bar segment 334, the discharger 329, and the sweep bar 334 back into normal position. The bowl rotation resumes, and the parts 328 once again are fed into the track 330, resuming normal operation.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An unjamming system for use in connection with mass-produced parts fed through a process path in a process direction, the parts being fed by a parts feeder, the unjamming system comprising:
   a jamming region wherein unjamming is carried out;
   a sensor adjacent the process path for detecting a part error, the sensor being adapted for generating a sensor signal;
   first and second opposed elongated guide bars spaced apart a predetermined distance and adapted for receiving and conveying the parts between the guide bars, the process path extending between the guide bars, the first guide bar having a first guide bar opening therethrough adjacent the jamming region such that the first guide bar opening is defined on the first guide bar; and
   a guide bar segment disposed in the first guide bar opening, the guide bar segment being adapted for conveying the parts in concert with the first guide bar, the guide bar segment being adapted for movement transversely away from the process path in response to the sensor signal, thereby increasing the distance between the guide bar segment and the second guide bar, so as to provide clearance for eliminating the part error.

2. The unjamming system of claim 1, further comprising:
   the guide bar segment being adapted for movement between a first position inboard of the first guide bar and a second position outboard of the first position;
   wherein in the first position the distance between the guide bar segment and the second guide bar is less than the predetermined distance between the first and second guide bars, and the parts follow the process path allowing passage therethrough of parts in a process position, and denying passage therethrough of parts in a skewed position, so that the skewed parts will stop moving through the process path and the skewed parts will come to rest in the process path and captured against the guide bar segment, resulting in a parts error; and wherein in the second position the distance between the guide bar segment and the second guide bar is sufficient to release the skewed part, thereby providing clearance for eliminating the part error.

3. The unjamming system of claim 1, further comprising an air nozzle adjacent the jamming region and directed in a direction opposite to the process direction, the air nozzle being connected to a pressurized air supply, the air nozzle being adapted for delivering a jet of air to the part error in response to the sensor signal, so as to blow the parts in a direction opposite to the process direction to eliminate the part error.

4. The unjamming system of claim 3, wherein the parts feeder further comprises a generally circular bowl feeder adapted for rotation in a process rotary direction, the bowl feeder being adapted for reversing for rotation in a direction opposite to the process rotary direction, so as to receive the parts moving in the direction opposite to the process direction.

5. The unjamming system of claim 1, further comprising:
the first and second guide bars being spaced apart generally horizontally and the parts being supported against gravity;
the guide bar segment being adapted for movement between a first position generally aligned with the first guide bar and a second position outboard of the first position;
wherein in the first position the distance between the guide bar segment and the second guide bar is generally equal to the predetermined distance between the first and second guide bars, and the parts follow the process path allowing passage therethrough of parts in a process position; and
wherein in the second position the distance between the guide bar segment and the second guide bar is greater than the predetermined distance between the first and second guide bars, so that in the event of a part error to allow the parts to fall by gravity.

6. The unjamming system of claim 5, further comprising the guide bar segment being adapted for movement by a pneumatic cylinder.

7. The unjamming system of claim 5, further comprising:
the parts feeder having a plurality of pockets arranged in single-file order in the process direction, the pockets being open on one side, each one pocket of the plurality of pockets being adapted to receive a one of the parts;
an actuator disposed for translational movement transverse to the process direction; and
a sweep bar attached to the actuator adjacent the jamming region, the sweep bar being adapted for movement between a first position on a side of the pocket away from the open side, to a second position on a side of the pocket adjacent the open side, the sweep bar being vertically juxtaposed with the parts, so that upon movement from the first position to the second position the sweep bar will sweep the part out of the pocket.

8. The unjamming system of claim 7, further comprising:
a bracket attached to the actuator;
the guide bar segment being mounted on the bracket; and
a part discharger mounted on the bracket so that upon movement of the sweep bar from the first position to the second position the part discharger and the guide bar segment will move outward so as to allow the parts to be swept outward.

9. The unjamming system of claim 8, wherein the parts feeder further comprises a generally circular bowl feeder adapted for rotation in a process rotary direction, the bowl feeder having an outer periphery along which the pockets are disposed in arcuate single-file, the pockets being open on an outer side thereof, the bowl feeder having an outer wall extending around the outer periphery radially outboard of the pockets, the outer wall having a discontinuity therethrough adjacent the jamming region so as to allow the parts to be swept outward beyond the outer wall.

10. A method for unjamming a part error, for use in connection with mass-produced parts fed through a process path in a process direction, the parts being fed by a parts feeder, the method comprising:
providing a jamming region wherein unjamming is carried out;
detecting a part error with a sensor adjacent the process path, the process path extending between first and second opposed elongated guide bars, the first guide bar having a first guide bar opening therethrough such that the first guide bar opening is defined on the first guide bar;
generating a sensor signal with the sensor;
removing the parts from the part error in response to the sensor signal;
moving the parts in a direction opposite to the process direction; and
returning the parts to the parts feeder.

11. The method of claim 10, further comprising:
disposing an air nozzle adjacent the jamming region and directing the air nozzle in a direction opposite to the process direction;
connecting the air nozzle to a pressurized air supply;
delivering a jet of air to the part error through the air nozzle in response to the sensor signal; and
blowing the parts in a direction opposite to the process direction; thereby eliminating the part error.

12. The method of claim 11, further comprising:
blowing the parts in a direction opposite to the process direction with the jet of air; thereby
returning the parts to the parts feeder in a direction opposite to the process direction with the jet of air.

13. The method of claim 12, further comprising:
providing a generally circular bowl feeder for the parts feeder;
adapting the bowl feeder for rotation in a process rotary direction;
reversing rotation of the bowl feeder for rotation in a direction opposite to the process rotary direction; and
receiving, in the bowl feeder, the parts moving in the direction opposite to the process direction.

14. A method for unjamming a part error, for use in connection with mass-produced parts fed through a process path in a process direction, the parts being fed by a parts feeder, the method comprising:
providing a jamming region wherein unjamming is carried out;
detecting a part error with a sensor adjacent the process path;
generating a sensor signal with the sensor;
spacing first and second opposed elongated guide bars apart a predetermined distance;
receiving and conveying the parts between the first and second guide bars;
extending the process path between the guide bars;

providing a first guide bar opening through the first guide bar adjacent the jamming region such that the first guide bar opening is defined on the first guide bar;
disposing a guide bar segment in the first guide bar opening;
conveying the parts along the guide bar segment in concert with the first guide bar;
moving the guide bar segment transversely away from the process path in response to the sensor signal; and
increasing the distance between the guide bar segment and the second guide bar, thereby providing clearance for eliminating the part error.

15. The method of claim 14, further comprising:
disposing the guide bar segment in a first position inboard of the first guide bar wherein the distance between the guide bar segment and the second guide bar is less than the predetermined distance between the first and second guide bars;
allowing passage through the process path of parts in a process position, with the guide bar segment in the first position;
denying passage through the process path of parts in a skewed position, with the guide bar segment in the first position;
stopping movement through the process path of parts in a skewed position;
capturing the skewed parts against the guide bar segment, so that the skewed parts will come to rest in the process path resulting in a parts error;
moving the guide bar segment to a second position outboard of the first position in response to the sensor signal, wherein in the second position the distance between the guide bar segment and the second guide bar is sufficient to release the skewed part; and
providing clearance in the second position for eliminating the part error.

16. The method of claim 14, further comprising:
disposing an air nozzle adjacent the jamming region and directing the air nozzle in a direction opposite to the process direction;
connecting the air nozzle to a pressurized air supply;
delivering a jet of air to the part error through the air nozzle in response to the sensor signal; and
blowing the parts in a direction opposite to the process direction; thereby eliminating the part error.

17. The method of claim 16, further comprising:
providing a generally circular bowl feeder for the parts feeder;
adapting the bowl feeder for rotation in a process rotary direction;
reversing rotation of the bowl feeder for rotation in a direction opposite to the process rotary direction; and
receiving in the bowl feeder the parts moving in the direction opposite to the process direction.

18. The method of claim 14, further comprising:
spacing the first and second guide bars apart generally horizontally;
supporting the parts against gravity;
disposing the guide bar segment in a first position generally aligned with the first guide bar, wherein in the first position the distance between the guide bar segment and the second guide bar is generally equal to the predetermined distance between the first and second guide bars;
allowing passage through the process path of parts in a process position, with the guide bar segment in the first position;
moving the guide bar segment to a second position outboard of the first position in response to the sensor signal, wherein in the second position the distance between the guide bar segment and the second guide bar is greater than the predetermined distance between the first and second guide bars, so as to provide clearance for eliminating the part error; and
allowing the parts to fall by gravity in the event of a part error.

19. The method of claim 18, further comprising:
providing the parts feeder with a plurality of pockets and arranging the pockets in single-file order in the process direction, the pockets being open on one side;
receiving one of the parts in one pocket of the plurality of pockets;
disposing an actuator for translational movement transverse to the process direction;
attaching a sweep bar to the actuator adjacent the jamming region in a first position on a side of the pocket away from the open side, and juxtaposing the sweep bar vertically with the parts;
moving the sweep bar to a second position on a side of the pocket adjacent the open side in response to the sensor signal; and
sweeping the part out of the pocket with the sweep bar.

20. The method of claim 19, further comprising:
attaching a bracket to the actuator;
mounting the guide bar segment on the bracket;
mounting a part discharger on the bracket;
moving the sweep bar from the first position to the second position; and
moving the part discharger and the guide bar segment outward with the sweep bar so as to allow the part to be swept outward.

21. The method of claim 19, further comprising:
providing a generally circular bowl feeder for the parts feeder;
disposing the pockets along an outer periphery of the bowl feeder in arcuate single-file, the pockets being open on a radially outer side thereof;
rotating the bowl feeder in a process rotary direction;
extending an outer wall around the outer periphery of the bowl feeder radially outboard of the pockets;
forming an opening through the outer wall adjacent the jamming region;
stopping the rotating of the bowl feeder in response to the sensor signal; and
rotationally indexing the bowl feeder and aligning the part error with the opening, so as to allow the part to be swept outward beyond the outer wall.

* * * * *